(12) United States Patent
Ho et al.

(10) Patent No.: US 11,216,091 B2
(45) Date of Patent: Jan. 4, 2022

(54) LIGHT EMITTING TOUCHPAD DEVICE

(71) Applicant: CHICONY POWER TECHNOLOGY CO., LTD., New Taipei (TW)

(72) Inventors: Hsuan-Wei Ho, New Taipei (TW); Yueh-Heng Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 64 days.

(21) Appl. No.: 16/809,934

(22) Filed: Mar. 5, 2020

(65) Prior Publication Data

US 2020/0301524 A1 Sep. 24, 2020

Related U.S. Application Data

(60) Provisional application No. 62/821,110, filed on Mar. 20, 2019.

(30) Foreign Application Priority Data

Jan. 8, 2020 (TW) .................................. 109100646

(51) Int. Cl.
*G06F 3/0354* (2013.01)
*G06F 3/0488* (2013.01)
(Continued)

(52) U.S. Cl.
CPC .......... *G06F 3/03547* (2013.01); *G06F 1/169* (2013.01); *G06F 1/1671* (2013.01);
(Continued)

(58) Field of Classification Search
CPC ...... G06F 1/1671; G06F 1/169; G06F 1/1692; G06F 3/0202; G06F 3/03547; G06F 3/041; G06F 3/04886
(Continued)

(56) References Cited

U.S. PATENT DOCUMENTS 8,232,810 B2 * 7/2012 Reynolds .............. G06F 3/0443
324/662
9,118,036 B2   8/2015 Kim
(Continued)

FOREIGN PATENT DOCUMENTS

CN    204143653 U    2/2015
CN    106489123 A    3/2017
(Continued)

*Primary Examiner* — Kwin Xie
(74) *Attorney, Agent, or Firm* — Muncy, Geissler, Olds & Lowe, P.C.

(57) ABSTRACT

The present disclosure discloses a light emitting touchpad device including a circuit board, a plurality of sensing elements, a light guiding plate, a plurality of first spacing blocks, and a plurality of second spacing blocks. The sensing elements are disposed on the circuit board. Each of the first spacing blocks and each of the second spacing blocks are respectively disposed on a bottom surface and a top surface of the light guiding plate, and are all located in a nil-light spot area of the light guiding plate. A spacing distance between two adjacent first spacing blocks is a third length. A spacing distance between two adjacent second spacing blocks is a fifth length. A position of any one of the second spacing blocks corresponds to a position between two of the first spacing blocks.

15 Claims, 7 Drawing Sheets

(51) Int. Cl.
*G06F 1/16* (2006.01)
*G06F 3/041* (2006.01)
*G06F 3/02* (2006.01)

(52) U.S. Cl.
CPC ........ *G06F 3/04886* (2013.01); *G06F 3/0202* (2013.01); *G06F 3/041* (2013.01)

(58) Field of Classification Search
USPC .................................. 345/156–169, 173–174
See application file for complete search history.

(56) References Cited

U.S. PATENT DOCUMENTS

| | | | |
|---|---|---|---|
| 9,581,754 B2 | 2/2017 | Shibata | |
| 9,684,382 B2* | 6/2017 | Shaw | G06F 3/0446 |
| 10,317,578 B2 | 6/2019 | Sarma et al. | |
| 2007/0152983 A1 | 7/2007 | McKillop et al. | |
| 2012/0044716 A1* | 2/2012 | Lee | G06F 3/0202 |
| | | | 362/616 |
| 2013/0181896 A1* | 7/2013 | Gruhlke | G06F 3/017 |
| | | | 345/156 |
| 2014/0354596 A1 | 12/2014 | Djordjev et al. | |
| 2015/0370396 A1* | 12/2015 | Hotelling | G06F 3/0443 |
| | | | 345/174 |
| 2016/0070416 A1 | 3/2016 | Wassvik | |
| 2016/0077640 A1* | 3/2016 | Brinkley | G02F 1/133512 |
| | | | 345/173 |
| 2016/0098131 A1* | 4/2016 | Ogata | G06F 3/0446 |
| | | | 345/173 |

FOREIGN PATENT DOCUMENTS

| | | |
|---|---|---|
| CN | 109478113 A | 3/2019 |
| TW | I222036 B | 10/2004 |
| TW | 201025101 A1 | 7/2010 |
| TW | 201205149 A1 | 2/2012 |
| TW | I399681 B1 | 6/2013 |
| TW | I446215 B | 7/2014 |
| TW | M531615 U | 11/2016 |
| TW | 201712379 A | 4/2017 |
| TW | I582706 B | 5/2017 |
| TW | I639108 B | 10/2018 |
| WO | WO2016172917 A1 | 11/2016 |

\* cited by examiner

LIGHT EMITTING TOUCHPAD DEVICE

BACKGROUND

1. Technical Field

The present disclosure relates to a touchpad device, and more particularly to a light emitting touchpad device.

2. Description of the Related Art

A conventional touchpad does not provide a light emitting effect, but usually has purely a trajectory input mode and is used in substitution for an input function of a mouse. In order to satisfy various input modes, an application of a novel touchpad, i.e., a lighting touchpad (herein referred to as a light emitting touchpad device) combining a touchpad and a backlight module, has become commercially available. Taking present light emitting touchpad devices for instance, when not emitting light, each light emitting touchpad device performs a common touchpad mode (trajectory detection), such as being used for manipulating a mouse cursor; when emitting light, each light emitting touchpad device reveals a specific pattern, and performs a function corresponding to the specific pattern, such as displaying a numeric keypad and performing a tap input mode. Obviously the specific pattern is usually the location of a light emitting area of each light emitting touchpad device.

A light emitting touchpad mostly consists of films stacked in multiple layers and a circuit board provided with a light emitting component, and the staked layers are usually bound by glue in between. In order to meet sensing requirements of touchpad (that is, preventing misjudgment issues of a touch control system), glue is generally applied in full range of an area that light emission is not needed (that is, an area without the specific pattern), such that the surface of the touchpad maintains evenness and is unlikely deformed under the pressing of a user, so as to prevent inconsistency of touch sensing signals. However, if a film for guiding light is directly applied by an adhesive, an effect similar to optical dots would be produced (that is, the conditions for total inner reflection of light propagating within the film are changed). Hence, the efficiency of light emission of the light emitting touchpad device is degraded if the glue is applied in full range of a light guide film. In view of the above issue, manufacturers of present light emitting touchpad devices adopt a method of applying an adhesive in which the adhesive is only applied along the periphery of a light emitting area on a light guide film of a light emitting touchpad device, usually looked like a hollowed square. However, such method of applying the adhesive easily causes the recessed level of an area without the adhesive (i.e., the light emitting area) being greater than that of an area with the adhesive when the area without the adhesive is pressed or touched by a user (as a matter of course, a functional virtual key or button would be located at the light emitting area). Consequently, if the recessed levels of different positions on the touched surface are differ, while the user presses the touchpad device, these pressed positions would cause system to generate touch sensing signals with different intensities, respectively, such that the system would be hard to accurately set a determination threshold value for all touch sensing signals, and thus a rate that the touch control system misjudges the tapped positions would be significantly increased.

SUMMARY

In view of above issues, it is a major object of the present disclosure to provide a light emitting touchpad device, which includes a plurality of spacing blocks concurrently disposed on two opposite surfaces of a light guiding plate. With a special configuration of the spacing blocks, the probability that a touch control system misjudges a tapped position on a conventional light emitting touchpad device can be reduced.

To achieve the above object, the present disclosure provides a light emitting touchpad device including a circuit board, a plurality of sensing elements, a light guiding plate, a light emitting component, a plurality of first spacing blocks, a plurality of second spacing blocks and a control unit. The sensing elements are disposed on the circuit board, and a distance between geometric centers of two adjacent sensing elements is a first length. The light guiding plate is disposed above the circuit board, and includes at least one light spot area, at least one nil-light spot area, a bottom surface and a top surface. A plurality of light spots are disposed in the light spot area, and no light spots are disposed in the nil-light spot area. The bottom surface faces the circuit board, and the top surface is located on a side opposite to the bottom surface. The light emitting component is disposed adjacent to the light guiding plate, and emits light toward the light guiding plate. The first spacing blocks are disposed on the bottom surface and located in the nil-light spot area. A distance between geometric centers of two adjacent first spacing blocks is a second length, and a spacing distance between two adjacent first spacing blocks is a third length. The second spacing blocks are disposed on the top surface and located in the nil-light spot area. A distance between two geometric centers of two adjacent second spacing blocks is a fourth length, and a spacing distance between two adjacent second spacing blocks is a fifth length. A position of any one of second spacing blocks corresponds to a position between two of the first spacing blocks. The control unit is electrically connected to the sensing elements and the light emitting component.

According to an embodiment of the present disclosure, the fourth length is equal to the second length, and the fifth length is equal to the third length.

According to an embodiment of the present disclosure, the second length is twice the third length.

According to an embodiment of the present disclosure, a geometric center of any one of the first spacing blocks is aligned with a geometric center of one of the sensing elements.

According to an embodiment of the present disclosure, a geometric center of any one of the second spacing block is aligned with a geometric center of one of the sensing elements.

According to an embodiment of the present disclosure, the second length is less than or equal to twice the first length.

According to an embodiment of the present disclosure, the third length is less than a sixth length, and the sixth length is a diameter of a cylindrical test rod or a maximum dimension of a surface of an open end of a non-cylindrical test rod.

According to an embodiment of the present disclosure, the light emitting touchpad device further includes a reflective plate. The reflective plate is disposed between the circuit board and the light guiding plate. The first spacing blocks are located between the light guiding plate and the reflective plate and support the light guiding plate.

According to an embodiment of the present disclosure, the circuit board further includes a plurality of protrusions, and the light emitting touchpad device further includes a plurality of air discharging blocks. The air discharging blocks are disposed between the reflective plate and the circuit board, and are respectively located at the protrusions.

According to an embodiment of the present disclosure, the light emitting touchpad device further includes a black mask and a contact plate. The black mask is located above the light guiding plate, and the second spacing blocks are located between the black mask and the light guiding plate and support the black mask. The contact plate is disposed above the black mask.

According to an embodiment of the present disclosure, each of the first spacing blocks is a flexible block formed by solidified glue, and each of the second spacing blocks is a flexible block formed by solidified glue.

As described above, the light emitting touchpad device according to the present disclosure includes a plurality of first spacing blocks disposed on the bottom surface of the light guiding plate and a plurality of second spacing blocks disposed on the top surface of the light guiding plate. The first spacing blocks and the second spacing blocks are all located in a nil-light spot area. The distance between the geometric centers of two adjacent first spacing blocks is a second length, and the spacing distance between two adjacent first spacing blocks is a third length. The distance between the geometric centers of two adjacent second spacing blocks is a fourth length, and the spacing distance between two adjacent second spacing blocks is a fifth length. Further, the position of any one of the second spacing blocks corresponds to the position between two of the first spacing blocks. In sum, the first spacing blocks and the second spacing blocks are disposed in a manner of complementary intervals in the nil-light spot area of the light guiding plate, such that any position on the surface of the light emitting touchpad device which is pressed by a user can be uniformly recessed, thereby generating touch sensing signals with a consistent intensity and further achieving an effect of preventing touch control system from misjudgment. In addition, because the first spacing blocks and the second spacing blocks are disposed in a manner of intervals on the light guiding plate, a loss of light energy is reduced, and an overall efficiency of light emission of the light emitting touchpad device is enhanced.

DETAILED DESCRIPTION OF THE EMBODIMENTS

Hereafter, the technical content of the present disclosure will be better understood with reference to preferred embodiments.

Figure 1:
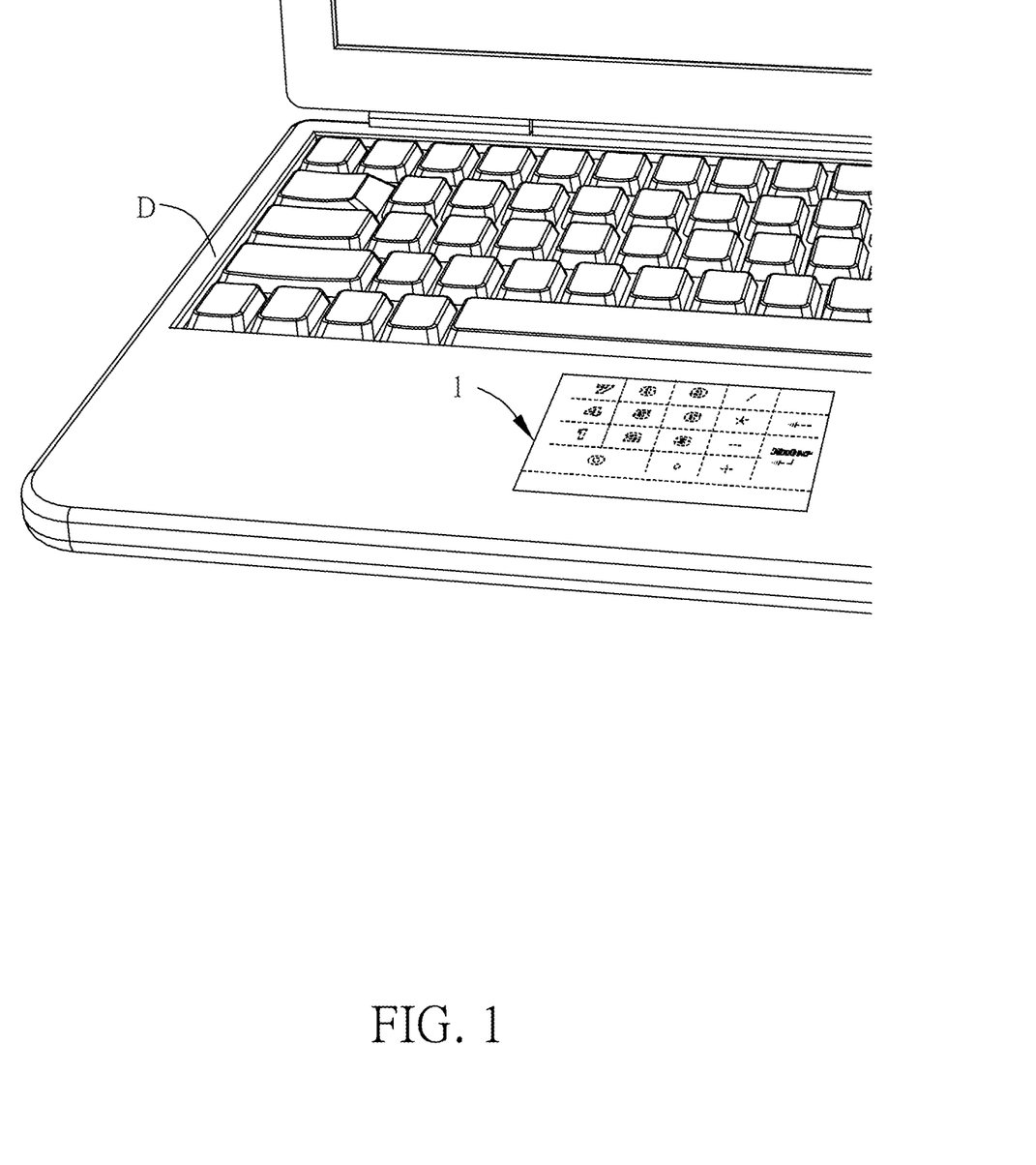
FIG. 1 is a schematic perspective view of a light emitting touchpad device applied to a portable electronic device according to an embodiment of the present disclosure.
Figure 2:
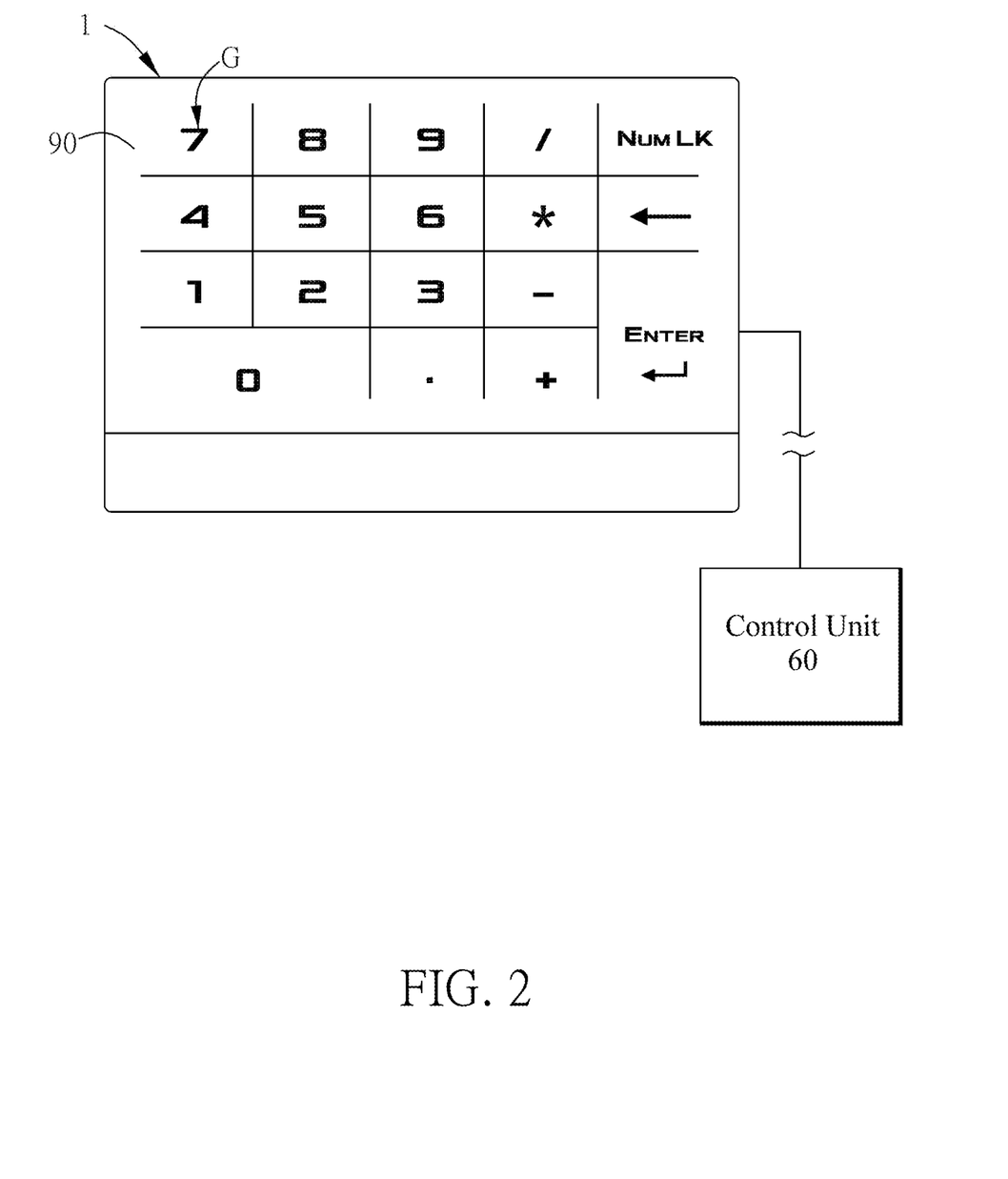
FIG. 2 is a schematic top view of the light emitting touchpad device shown in FIG. 1.
Figure 3:
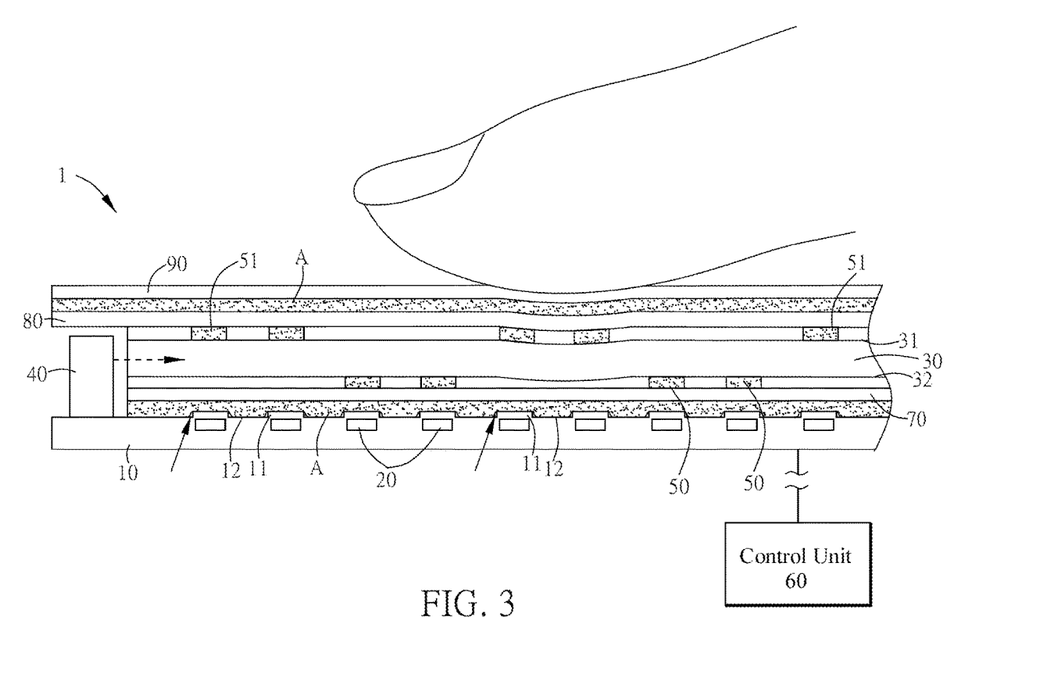
FIG. 3 is a schematic partial sectional view of the light emitting touchpad device shown in FIG. 2 being touched by a user's finger.
Figure 4:
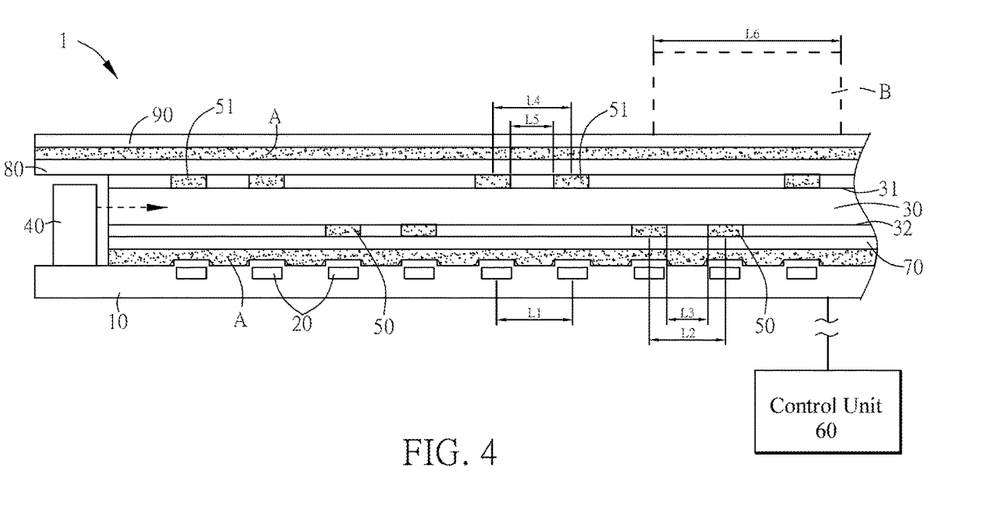
FIG. 4 is a schematic partial sectional view of the light emitting touchpad device shown in FIG. 2 being touched by a metal test rod.
Figure 5:
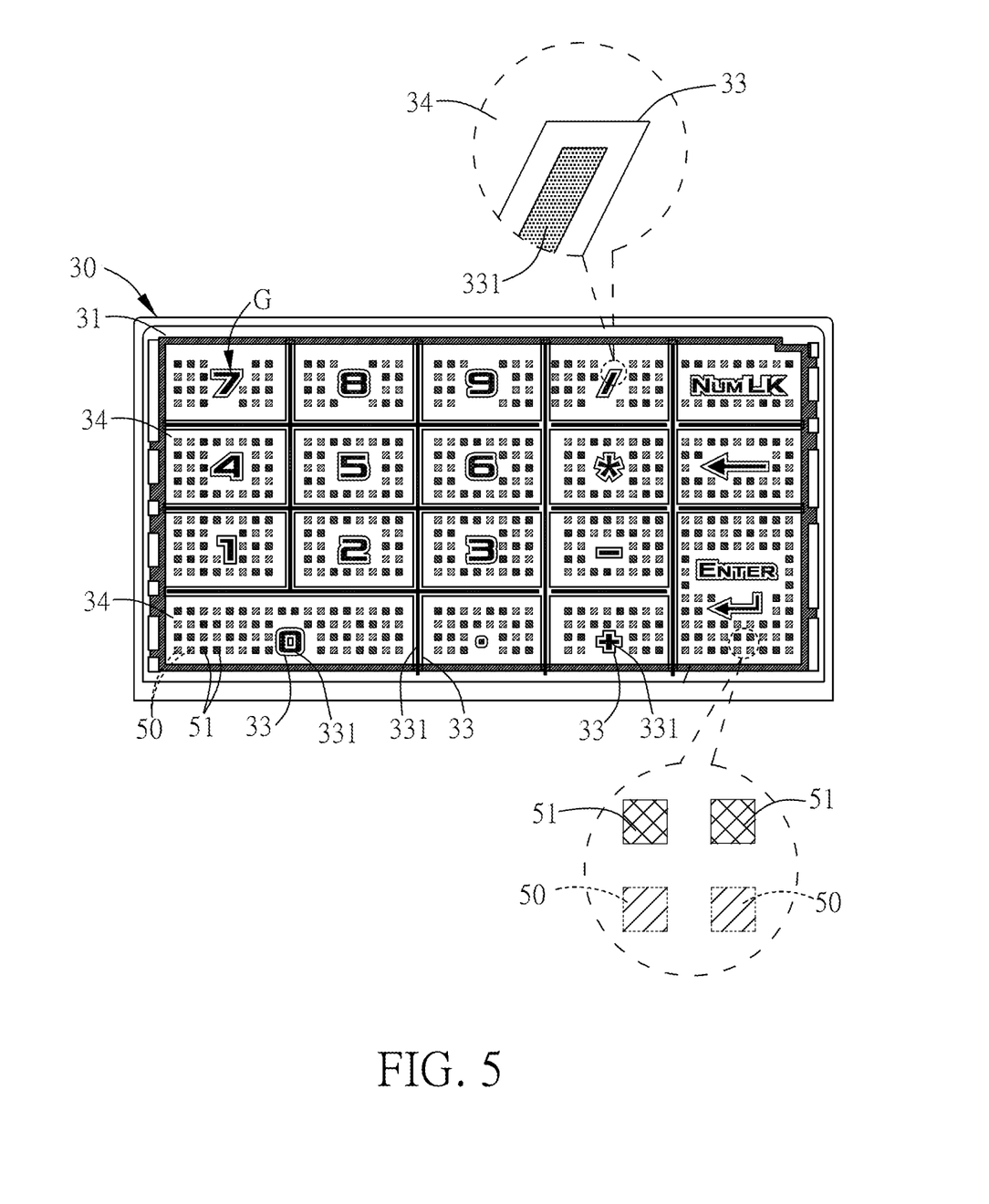
FIG. 5 is a schematic top view of a light guiding plate, first spacing blocks and second spacing blocks of the light emitting touchpad device shown in FIG. 2.

FIG. 1 shows a schematic perspective view of a light emitting touchpad device applied to a portable electronic device according to an embodiment of the present disclosure. FIG. 2 shows a schematic top view of the light emitting touchpad device shown in FIG. 1. FIG. 3 shows a schematic partial sectional view of the light emitting touchpad device shown in FIG. 2 being touched by a user's finger. FIG. 4 shows a schematic partial sectional view of the light emitting touchpad device shown in FIG. 2 being touched by a metal test rod. FIG. 5 shows a schematic top view of a light guiding plate, first spacing blocks and second spacing blocks of the light emitting touchpad device shown in FIG. 2. Refer to FIG. 1 to FIG. 5. In this embodiment, a light emitting touchpad device 1 can be applied as a touchpad of a portable electronic device D (e.g., a laptop computer), and can perform at least two different input modes, for example, a default input mode (e.g., trajectory detection) for manipulating a mouse cursor, and a specific input mode corresponding to a specific pattern G displayed by the light emitting touchpad device 1, such as a tap input mode corresponding to a numeric keypad pattern shown in FIG. 2 (i.e., the specific pattern G, to be further described later).

As shown in FIG. 2 and FIG. 3, the light emitting touchpad device 1 of the embodiment includes a circuit board 10, a plurality of sensing elements 20, a light guiding plate 30, a light emitting component 40, a plurality of first spacing blocks 50, a plurality of second spacing blocks 51, and a control unit 60. The sensing elements 20 and the light emitting component 40 are disposed on the circuit board 10. The control unit 60 is electrically connected to the sensing elements 20 and the light emitting component 40, such that the control unit 60 receives sensing signals (i.e., touch sensing signals) sent by the sensing elements 20, and controls the light emitting components 40 to emit light according to the input mode performed by the light emitting touchpad device 1. Further, the control unit 60 can be disposed in a portable electronic device D (e.g., a motherboard system in the portable electronic device D) or be disposed on the circuit board 10 (e.g., a microcontroller chip on the circuit board 10), and is not specifically limited by the present disclosure. Therefore, the control units 60 depicted in FIG. 2, FIG. 3 and FIG. 4 are represented by diagrammatic boxes, respectively.

In this embodiment, the sensing elements 20 are arranged in equidistant spacing. For example, a distance between two geometric centers of two adjacent sensing elements 20 is a first length L1 (as shown in FIG. 4). Preferably, the plurality of sensing elements 20 are arranged in form of a two-dimensional array on the circuit board 10, and each of the sensing elements 20 can be a capacitive sensor. When an object carrying electric charge becomes close to the circuit board 10, for example, when a finger (an electrically charged object) touches the light emitting touchpad device 1, the sensing element 20 which is closer to the finger produces an induced current as a result of enduring an electric field, and then the sensing element 20 sends a sensing signal corresponding to the value of the sensing current to the control unit 60. The control unit 60 accordingly learns the position touched by the finger from the sensing signal, and establishes a connection with a program of the input mode which is currently executed by the portable electronic device D, so as to run a corresponding process (e.g., manipulating a mouse cursor displayed on a screen).

As shown in FIG. 4 and FIG. 5, the light guiding plate 30 is disposed above the circuit board 10. The light emitting component 40 of this embodiment is disposed adjacent to a side edge of the light guiding plate 30, and emits light toward the light guiding plate 30. The light guiding plate 30 of this embodiment includes a top surface 31, a bottom surface 32, at least one light spot area 33, and at least one nil-light spot area 34. In this embodiment, the light guiding plate 30 including a plurality of light spot areas 33 and a plurality of nil-light spot areas 34 is taken as an example for illustration purposes. The bottom surface 32 faces the circuit board 10, and the top surface 31 is located on the side opposite to the bottom surface 32, in which the top surface 31 is a light exiting surface. It should be noted that, FIG. 3 and FIG. 4 are schematic partial sectional views corresponding to the nil-light spot areas 34, and the light spot areas 33 are not depicted in FIG. 3 and FIG. 4. FIG. 5 is a schematic top view of looking downward from the side where the top surface 31 is located. A plurality of light spots 331 are disposed in the light spot area 33, and form an optical-dot structure in a dense arrangement (referring to the partial enlarged view in FIG. 5). The light spots 331 are arranged to form the specific pattern G, and thus the specific pattern G shown in FIG. 5 is represented in solid black. The light spots 331 can be disposed on the top surface 31 or the bottom surface 32, and are not limited by the present disclosure. Each of the light spots 331 can be a dot formed by printed ink, or can be a microstructure formed by roughening the surface of the light guiding plate 30, such as a microstructure protruding outward from the surface and a microstructure recessing inward from the surface, so as to cancel the conditions of total inner reflection while the light propagates inside the light guiding plate 30. Once the light emitted by the light emitting component 40 reaches the light spot area 33, a part of the light is guided toward the top surface 31 (i.e., the light exiting surface) by the light spots 331. Because the lights spots 331 sabotage the total inner reflection of the part of the light, thus the part of the light would change its propagation direction toward the top surface 31.

That is to say, only an area distributed with the light spots 331 (i.e., the light spot area 33) presents a visual effect of light emission. In this embodiment, the light spots 331 in at least one light spot area 33 among the plurality of light spot areas 33 are arranged to present the foregoing specific pattern G, such as numerals, operands, arrows and characters, as shown in FIG. 2. In other words, the arrangement of the light spots 331 within a part of the light spot areas 33 present the specific pattern G (e.g., numerals, operands, arrows or characters). In the tap input mode, the control unit 60 controls the light emitting component 40 to emit light, such that the light enters the light guiding plate 30, arrives at the light spots 331, and is guided toward the top surface 31 (i.e., the light exiting surface), enabling the specific pattern G to present a light-emitting effect and allowing a user to identify the location of a (virtual) key on the touchpad. In contrast, no light spots 331 are disposed in the nil-light areas 34, hence the nil-light spot areas 34 do not provide any light emitting effect.

As shown in FIG. 4 and FIG. 5, the first spacing blocks 50 and the second spacing blocks 51 of this embodiment are located in the nil-light spot areas 34. Further, the first spacing blocks 50 are disposed on the bottom surface 32 of the light guiding plate 30, and the second spacing blocks 51 are disposed on the top surface 31 of the light guiding plate 30. In this embodiment, a distance between geometric centers of two adjacent first spacing blocks 50 is a second length L2, and a spacing distance between two adjacent first spacing blocks 50 is a third length L3. A distance between geometric centers of two adjacent second spacing blocks 51 is a fourth length L4, and a spacing distance between two adjacent second spacing blocks 51 is a fifth length L5. In other words, for the two first spacing blocks 50 located closest to each other, the distance between the geometric centers thereof is the second length L2, and the spacing distance thereof is the third length L3. Similarly, for the two second spacing blocks 51 located closest to each other, the distance between the geometric centers thereof is the fourth length L4, and the spacing distance thereof is the fifth length L5. Preferably, the deployment of the closest second spacing blocks 51 can be the same as that of the closest first spacing blocks 50; that is, the fourth length L4 is equal to the second length L2, and the fifth length L5 is equal to the third length L3.

Further, the spacing distance between two adjacent first spacing blocks 50 located closest to each other (e.g., the third length L3) can be equal to a horizontally-extended length of the first spacing blocks 50, such that the second length L2 is twice the third length L3. Preferably, a geometric center of any one of the first spacing blocks 50 is aligned with a geometric center of one of the sensing elements 20, and a geometric center of any one of the second spacing blocks 51 is also aligned with a geometric center of one of the sensing elements 20. Further, the second length L2 (the distance between the geometric centers of two adjacent first spacing blocks 50) can be less than or equal to twice the first length L1 (the distance between the geometric centers of two adjacent sensing elements 20). In this embodiment, the second length L2 is less than twice the first length L1, and substantially equal to the first length L1. In other words, in this embodiment, the distance between the geometric centers of two first spacing blocks 50 located closest to each other (or two second spacing blocks 51 located closest to each other) is the same as the distance between the geometric centers of two adjacent sensing elements 20.

Further, a position of any one of the second spacing blocks 51 corresponds to a position between two of the first spacing blocks 50, such that the first spacing blocks 50 and the second spacing blocks 51 are arranged in a way of complementary intervals in which the second spacing blocks 51 on top are complementary to the first spacing blocks 50 on bottom. In sum, the first spacing blocks 50 and the second spacing blocks 51 are spatial complements to each other, and each of them is disposed separately in the nil-light spot areas 34 of the light guiding plate 30, in which the first spacing blocks 50 are disposed on the bottom surface 32 of the light guiding plate 30, and the second spacing blocks 51 are disposed on the top surface 31. With the complementary arrangement of the first spacing blocks 50 and the second spacing blocks 51, a touched surface of the light emitting touchpad device 1 is enabled to be recessed slightly and uniformly no matter which position of the surface is pressed by a user, hence generating touch sensing signals with a consistent intensity. Therefore, a determination threshold value for most all touch signals can be simply and accurately set for the touch control system of the light emitting touchpad device 1, further achieving an effect of preventing the touch control system from misjudging the touched positions.

During a phase of quality detection of a light emitting touchpad device 1, a cylindrical metal test rod or a non-cylindrical metal test rod B (e.g., a tapered square-towershaped rod) is frequently used to perform a standard test of touch accuracy. In this embodiment, a maximum dimension of a surface of an open end of the non-cylindrical metal test rod B is defined as a sixth length L6, as shown in FIG. 4. In other embodiments, using a cylindrical metal test rod for a test of touch accuracy, a diameter of the cylindrical metal test rod can be defined as the sixth length L6. Thus, to achieve the effect of preventing touch control system from misjudgment, the third length L3 is designed to be less than the sixth length L6, and the fifth length L5 is also designed to be less than the sixth length L6 for the light emitting touchpad device 1. In other words, in this embodiment, the first spacing blocks 50 and the second spacing blocks 51 are arranged in a manner of intervals, and the spacing distance between two adjacent first spacing blocks 50 (i.e., the third length L3) and the spacing distance between two adjacent second spacing blocks 51 (i.e., the fifth length L5) are designed to be less than the maximum dimension of the surface of an open end of the non-cylindrical metal test rod B (i.e., the sixth length L6), so as to achieve an optimal effect of preventing misjudgment of a touch control system.

In this embodiment, each of the first spacing blocks 50 and each of the second spacing blocks 51 are flexible blocks formed by solidified glue, respectively. Specifically, several techniques, such as mesh printing, can be used for the bottom surface 32 and the top surface 31 of the light guiding plate 30 to periodically apply an adhesive, such as the glue that would become flexible after solidifying, and then the first spacing blocks 50 and the second spacing blocks 51 can be formed after solidifying the adhesive. Hence, the first spacing blocks 50 and the second spacing blocks 51 can be used for connecting other films in the light emitting touchpad device 1.

Specifically, the light emitting touchpad device 1 of this embodiment further includes a reflective plate 70, a black mask 80 and a contact plate 90. The reflective plate 70 is disposed between the circuit board 10 and the light guiding plate 30. The reflective plate 70 and the circuit board 10 of this embodiment are connected by an adhesive layer A formed by an adhesive (e.g., glue) which is applied in full range between the reflective plate 70 and the circuit board 10, and the reflective plate 70 and the light guiding plate 30 are connected by the first spacing blocks 50. More specifically, the first spacing blocks 50 are located between the light guiding plate 30 and the reflective plate 70, and they connect the reflective plate 70 with the light guiding plate 30 and support the light guiding plate 30. The reflective plate 70 can reflect the light refracted from the bottom surface 32 of the light guiding plate 30 back into the light guiding plate 30, so as to enhance the utilization rate of light energy. In addition, the black mask 80 is disposed above the light guiding plate 30, and the contact plate 90 is disposed above the black mask 80. The material of the contact plate 90 can be Mylar, glass or other materials that are suitable as a surface of a touchpad, and is not limited by the present disclosure. Further, the black mask 80 and the contact plate 90 can be bound together by an adhesive applied in full range between the black mask 80 and the contact plate 90 (forming another adhesive layer A, as shown in FIG. 4), and the black mask 80 and the light guiding plate 30 are connected by the second spacing blocks 51. Thus, the second spacing blocks 51 are located between the black mask 80 and the light guiding plate 30, and the second spacing blocks 51 can connect the light guiding plate 30 with the black mask 80 and support the black mask 80. In some other embodiments, the black mask 80 can be directly formed on one surface of the contact plate 90 which is toward the light guiding plate 30 by means of printed ink. Thus, the upper one of the two adhesive layers A can be omitted.

In general, the films (e.g., the light guiding plate 30 and the reflective plate 70) are connected to each other by an adhesive, such as glue, which is flexible after solidifying. To satisfy sensing requirements of a touchpad (i.e., maintaining surface evenness as much as possible to prevent system from misjudgment), in the prior art, glue is applied in full range of the nil-light spot areas 34 of the light guiding plate 30 (forming a result similar to the adhesive layer A described above); however, the original conditions for total inner reflection of the light propagating in the light guiding plate 30 would be sabotaged due to the glue. As a result, apart from affecting the light propagation in the light guiding plate 30, the loss of light energy is also increased, hence lowering the overall efficiency of the light emission of the light emitting touchpad device 1. In this embodiment, the first spacing blocks 50 and the second spacing blocks 51 are arranged in a manner of intervals in the nil-spot areas 34 of the light guiding plate 30. Thus, not only the binding function between the light guiding plate 30, the reflective plate 70 and the black mask 80 is kept, but also the loss of light energy is reduced, because the distributed areas of the first spacing blocks 50 and the second spacing blocks 51 are significantly less than the area of the glue applied in full range. Therefore, since the loss of light energy is reduced, the overall efficiency of light emission of the light emitting touchpad device 1 is effectively enhanced.

Figure 6:
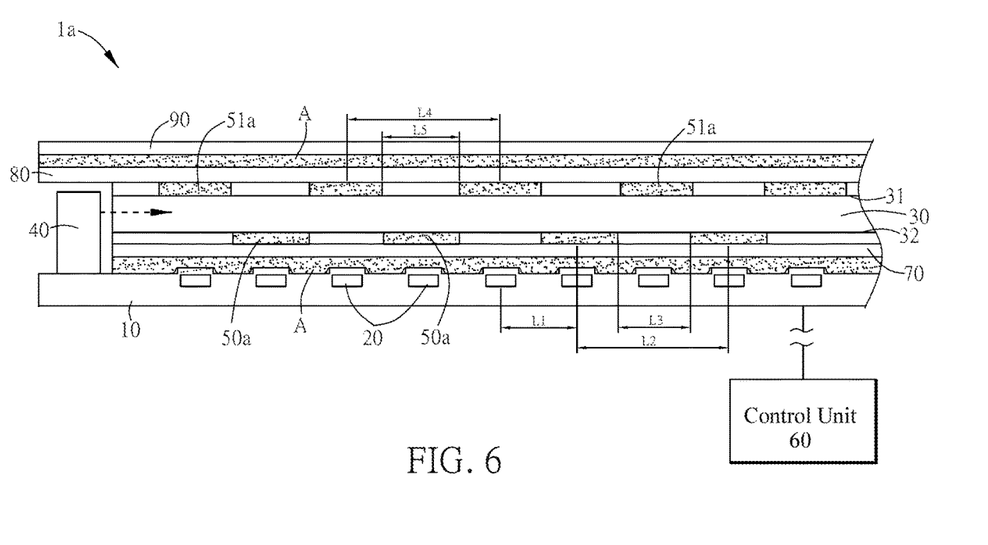
FIG. 6 is a schematic partial sectional view of a light emitting touchpad device according to another embodiment of the present disclosure.

FIG. 6 shows a schematic partial sectional view of a light emitting touchpad device according to another embodiment of the present disclosure. Referring to FIG. 6, first of all, a light emitting touchpad device 1a of this embodiment differs from the foregoing embodiment in the configurations of first spacing blocks 50a and second spacing blocks 51a (in aspects of their numbers and their spacing distances), as well as the lengths of the first spacing blocks 50a and the second spacing blocks 51a (with different sizes), while the denotations of other components are the same as those of the foregoing embodiment. In this embodiment, the second length L2 (a distance between geometric centers of two adjacent first spacing blocks 50a) is substantially equal to twice the first length L1 (a distance between geometric centers of two adjacent sensing elements 20). In other words, the first spacing blocks 50a and the second spacing blocks 51a of this embodiment are arranged in alternation, such that a width of a gap between two adjacent first spacing blocks 50a and a width of a gap between two adjacent second spacing blocks 51a are equal, and the gap between two adjacent first spacing blocks 50a and the gap between two adjacent second spacing blocks 51a are staggered, as shown in FIG. 6. Further, since the horizontally-extended lengths of the first spacing blocks 50a and the second spacing blocks 51a are much longer than the previous embodiment, a position of any one of the second spacing blocks 51a corresponds to a position between two adjacent first spacing blocks 50a. In other words, in this embodiment, a horizontal distance between any one of the first spacing blocks 50a and the closest second spacing block 51a from it is extremely small. If the said first spacing blocks 50a can overlap the said second spacing block 51a in vertical direction, the horizontal distance between them can even be zero (substantially). Thus, when a user performs a touch action on the contact plate 90 of the light emitting touchpad device 1a, particularly letting a finger perform a dragging and sliding action, because the width of the gap between any two adjacent first spacing blocks 50a and the width of the gap between any two adjacent second spacing blocks 51a are the same and the horizontal distance between any one of the first spacing blocks 50*a* and the closest second spacing block 51*a* from it is small, the user's finger would not feel any sense of lagging caused by the recessed surface, thus improving the user's operation experience while using the light emitting touchpad device 1*a*.

As shown in FIG. 3, In general, due to the circuit wiring and routing or the distribution of components of the circuit board 10, the surface of the circuit board 10 would appear numerous uneven and bumpy structures. Thus, in this embodiment, the circuit board 10 includes a plurality of protrusions 11 (usually having wires or components underneath) and a plurality of recesses 12 located between the protrusions 11. Since the reflective plate 70 and the circuit board 10 are connected by an adhesive (e.g., glue) applied in full range between the reflective plate 70 and the circuit board 10, some air bubbles are inevitably contained therein during the binding procedure of the reflective plate 70 and the circuit board 10. The contained air initially appears as tiny bubbles randomly distributed throughout the corners of the recesses 12, as indicated by the arrow signs illustrated in FIG. 3. However, as the glue is usually a material that softens upon encountering heat, after the light emitting touchpad device 1 is used by a user for a long period of time (for example, the heat produced by rubbing fingers or the waste heat from the operation of the portable electronic device D aggravates the softening of the glue), the tiny bubbles originally scattered around the recesses 12 become gathered forming several air bubbles in relatively larger sizes, thus causing the surface of the light emitting touchpad device 1 to bulge. Such non-ideal issue is usually referred to as "drumlins". To minimize "drumlins", in one embodiment, air discharging blocks 100 (see FIG. 7) can be disposed to achieve an air discharging effect after the reflective plate 70 and the circuit board 10 are bound together.

Figure 7:
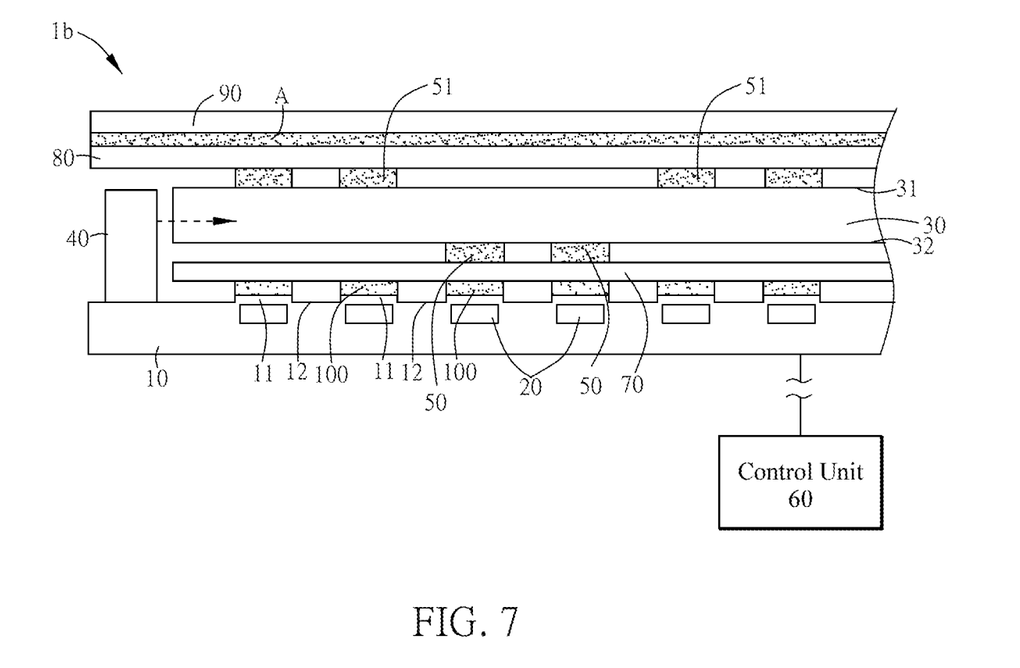
FIG. 7 is a schematic partial sectional view of a light emitting touchpad device according to yet another embodiment of the present disclosure.

FIG. 7 shows a schematic partial sectional view of a light emitting touchpad device according to yet another embodiment of the present disclosure. Referring to FIG. 7, a light emitting touchpad device 1*b* of this embodiment differs from the light emitting touchpad device 1 of the foregoing embodiment in that the light emitting touchpad device 1*b* further includes a plurality of air discharging blocks 100. The air discharging blocks 100 are disposed between the reflective plate 70 and the circuit board 10, and are respectively located at the protrusions 11. Further, the air discharging blocks 100 can be flexible blocks formed by solidified glue for connecting the circuit board 10 with the reflective plate 70. Specifically, while the light emitting touchpad device 1*b* is being manufactured, an adhesive, such as glue, which becomes flexible after solidifying can be applied onto the protrusions 11 of the circuit board 10, and then the air discharging blocks 100 are formed after the glue is solidified. In other words, the circuit board 10 and the reflective plate 70 are connected by the air discharging blocks 100 that are disposed at the protrusions 11 of the circuit board 10. The design of the air discharging blocks 100 reliefs the recesses 12 from being dead corners where air gathers, and further thoroughly discharges redundant air through the channels formed by the vacant spaces between the recesses 12 and the reflective plate 70, even when a large amount of air is contained during the binding procedure of the reflective plate 70 and the circuit board 10, thereby achieving an air discharging function and preventing the light emitting touchpad device 1*b* from "drumlins".

In conclusion, the light emitting touchpad device according to the present disclosure includes a plurality of first spacing blocks disposed on the bottom surface of the light guiding plate and a plurality of second spacing blocks disposed on the top surface of the light guiding plate. Further, all the first spacing blocks and the second spacing blocks are located in nil-light spot areas. The distance between the geometric centers of two adjacent first spacing blocks is a second length, and the spacing distance between the two adjacent first spacing blocks is a third length. The distance between the geometric centers of two adjacent second spacing blocks is a fourth length, and the spacing distance between two adjacent second spacing blocks is a fifth length. Further, the position of any one of the second spacing blocks corresponds to the position between two of the first spacing blocks. In sum, the first spacing blocks and the second spacing blocks are disposed in a manner of complementary intervals in the nil-light spot areas of the light guiding plate, such that any position on the surface of the light emitting touchpad device which is pressed by a user can be uniformly recessed, thereby generating touch sensing signals with a consistent intensity and further achieving the effect of preventing touch control system from misjudgment. In addition, because the first spacing blocks and the second spacing blocks are disposed in the manner of intervals on the light guiding plate, the loss of light energy is reduced, and the overall efficiency of light emission of the light emitting touchpad device is enhanced.

It should be noted that, the numerous embodiments above are examples for illustration purposes, and the claims set forth by the present disclosure should be accorded with the appended claims and are not to be limited by the embodiments above.

What is claimed is:

1. A light emitting touchpad device, comprising:
   a circuit board;
   a plurality of sensing elements, disposed on the circuit board, wherein a distance between geometric centers of adjacent two of the sensing elements is a first length;
   a light guiding plate, disposed above the circuit board, comprising at least one light spot area, at least one nil-light spot area, a bottom surface and a top surface, wherein a plurality of light spots are disposed in the at least one light spot area, no light spots are disposed in the nil-light spot area, the bottom surface faces the circuit board, and the top surface is located on one side opposite to the bottom surface;
   a light emitting component, disposed adjacent to the light guiding plate, emitting light toward the light guiding plate;
   a plurality of first spacing blocks, disposed on the bottom surface and located in the at least one nil-light spot area, wherein a distance between geometric centers of adjacent two of the first spacing blocks is a second length, and a spacing distance between adjacent two of the first spacing blocks is a third length;
   a plurality of second spacing blocks, disposed on the top surface and located in the at least one nil-light spot area, wherein a distance between geometric centers of adjacent two of the second spacing blocks is a fourth length, a spacing distance between adjacent two of the second spacing blocks is a fifth length, and a position of any one of the second spacing blocks corresponds to a position between two of the first spacing blocks; and
   a control unit, electrically connected to the sensing elements and the light emitting component.

2. The light emitting touchpad device according to claim 1, wherein the fourth length is equal to the second length, and the fifth length is equal to the third length.

3. The light emitting touchpad device according to claim 2, wherein the second length is twice the third length.

4. The light emitting touchpad device according to claim 3, wherein the second length is less than or equal to twice the first length.

5. The light emitting touchpad device according to claim 3, wherein the third length is less than a sixth length, and the sixth length is a diameter of a cylindrical test rod or a maximum dimension of a surface of an open end of a non-cylindrical test rod.

6. The light emitting touchpad device according to claim 2, wherein a geometric center of any one of the first spacing blocks is aligned with a geometric center of one of the sensing elements.

7. The light emitting touchpad device according to claim 6, wherein the second length is less than or equal to twice the first length.

8. The light emitting touchpad device according to claim 6, wherein the third length is less than a sixth length, and the sixth length is a diameter of a cylindrical test rod or a maximum dimension of a surface of an open end of a non-cylindrical test rod.

9. The light emitting touchpad device according to claim 2, wherein a geometric center of any one of the second spacing blocks is aligned with a geometric center of one of the sensing elements.

10. The light emitting touchpad device according to claim 9, wherein the second length is less than or equal to twice the first length.

11. The light emitting touchpad device according to claim 9, wherein the third length is less than a sixth length, and the sixth length is a diameter of a cylindrical test rod or a maximum dimension of a surface of an open end of a non-cylindrical test rod.

12. The light emitting touchpad device according to claim 1, further comprising:
   a reflective plate, disposed between the circuit board and the light guiding plate, wherein the first spacing blocks are located between the light guiding plate and the reflective plate and support the light guiding plate.

13. The light emitting touchpad device according to claim 12, the circuit board further comprising a plurality of protrusions, the light emitting touchpad device further comprising:
   a plurality of air discharging blocks, disposed between the reflective plate and the circuit board, the air discharging blocks respectively located at the protrusions.

14. The light emitting touchpad device according to claim 1, further comprising:
   a black mask, disposed above the light guiding plate, wherein the second spacing blocks are located between the black mask and the light guiding plate and support the black mask; and
   a contact plate, disposed above the black mask.

15. The light emitting touchpad device according to claim 1, wherein each of the first spacing blocks is a cured and flexible glue block, and each of the second spacing blocks is a cured and flexible glue block.

* * * * *